UNITED STATES PATENT OFFICE.

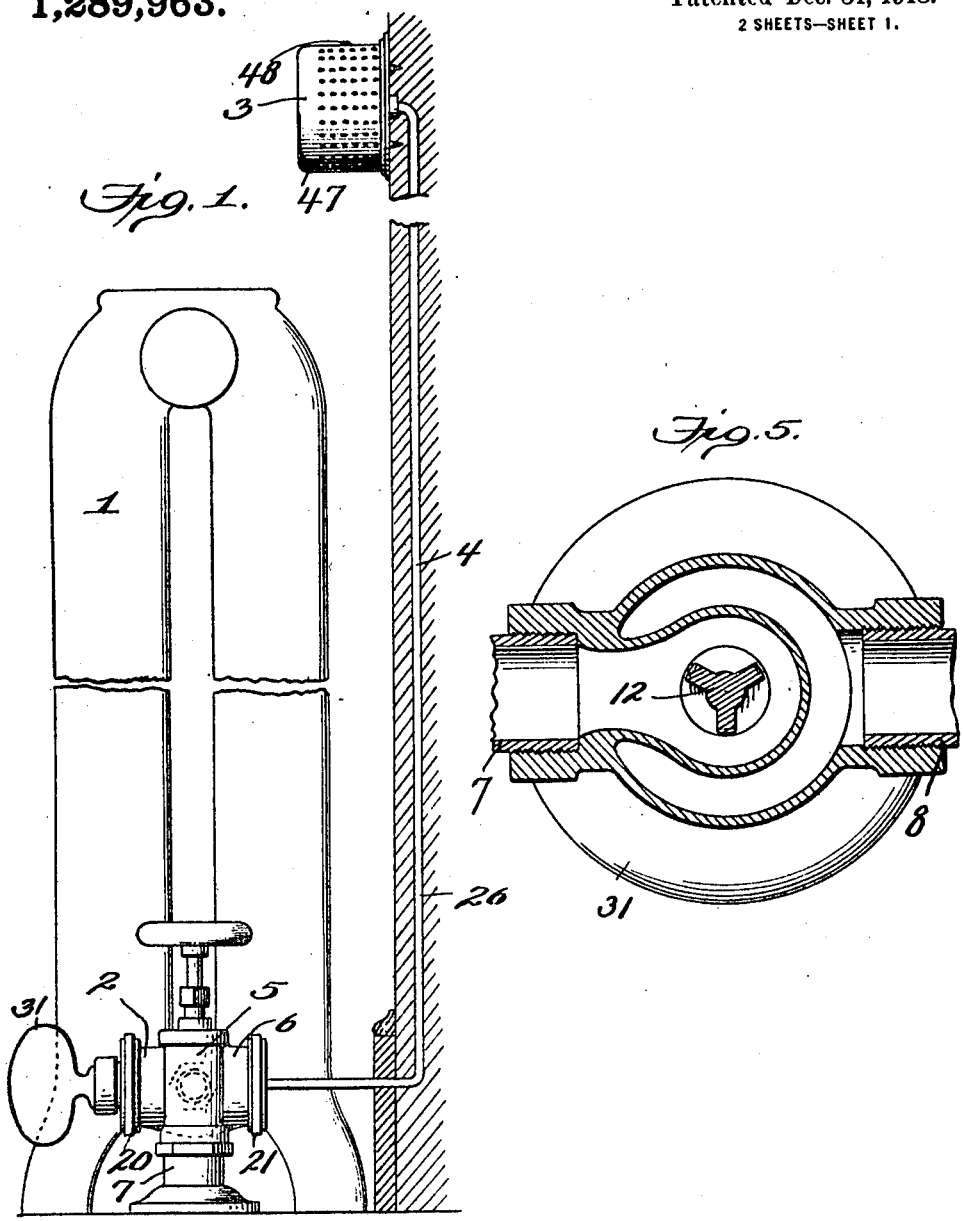

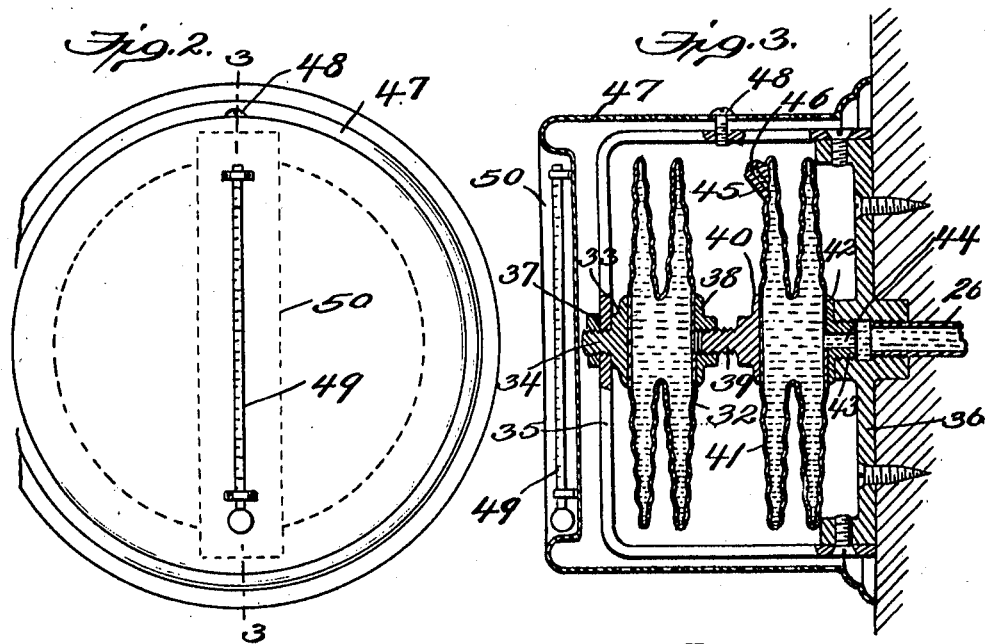
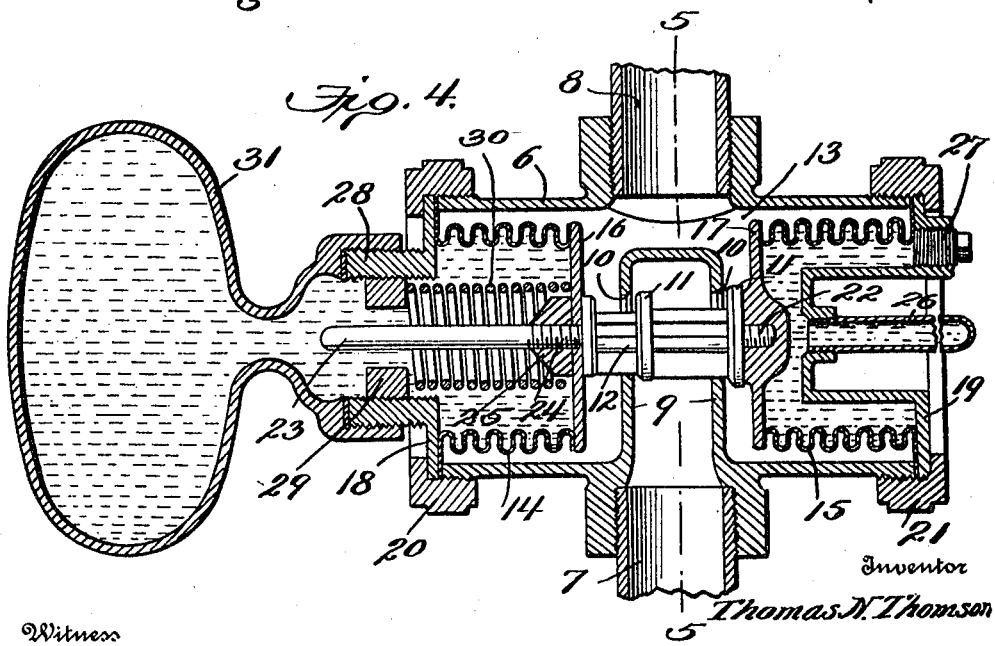

THOMAS N. THOMSON, OF SCRANTON, PENNSYLVANIA.

AUTOMATIC TEMPERATURE-REGULATOR.

1,289,963.

Specification of Letters Patent.

Patented Dec. 31, 1918.

Application filed June 21, 1917. Serial No. 176,236.

*To all whom it may concern:*

Be it known that I, THOMAS N. THOMSON, a citizen of the United States, residing at Scranton, in the county of Lackawanna and State of Pennsylvania, have invented new and useful Improvements in Automatic Temperature-Regulators, of which the following is a specification.

The present invention relates to improvements in automatic temperature regulators, and more particularly to those of the type adapted to be used in regulating the temperature of a room or other artificially heated space or chamber. The primary object of the invention is to provide an automatic temperature regulator whereby the temperature of the room, space or chamber is maintained by the automatic regulation of the heating medium under the control of an exactly balanced valve the operation of which is so sensitive that the valve can be opened or closed and the supply of heating medium turned on or shut off by the small power obtainable from an ordinary thermostat operating by the pressure of vapor from a liquid which volatilizes at a low temperature.

To these and other ends, the invention consists in certain improvements, and combinations and arrangements of parts, all as will be hereinafter more fully described, the novel features being pointed out particularly in the claims at the end of the specification.

In the accompanying drawing:—

Figure 1 shows an automatic regulator embodying the present invention, in connection with an ordinary steam or hot water radiator.

Fig. 2 is a front elevation of a thermostat adapted to be used in combination with the valve which controls the flow of the heating medium.

Fig. 3 represents a section through the thermostat on the line 3—3 of Fig. 2.

Fig. 4 represents a section through the valve which controls the supply of heating medium to the radiator, the section being taken in the plane of the axis of the valve.

Fig. 5 represents a transverse section through the valve on the line 5—5 of Fig. 4.

Similar parts are designated by the same reference characters in the several views.

Automatic regulating means embodying the present invention are applicable generally to all instances where it is desirable or necessary to automatically regulate or control the temperature of a room or other space, it being particularly applicable to steam or hot water radiators such as are used generally for the heating of rooms and apartments. The preferred embodiment of the invention is shown in the accompanying drawing and will be hereinafter described in detail, it comprising, generally, a balanced valve for the control of the heating medium, a thermostatic motor which is subject to the influence of the heat in the heated room or space, and means for communicating power from the motor to the valve in such manner as to operate the valve by the force generated by or within the thermostatic motor. It is to be understood that the invention is not restricted to the precise construction and arrangement shown, as equivalent constructions and arrangements are contemplated and will be included within the scope of the claims.

In the present instance, 1 designates an ordinary steam or hot water radiator, 2 designates, generally, the valve for controlling the flow of the heating medium to the radiator, 3 designates the thermostatic motor which is subject to the influence of the heat in the room or apartment the temperature of which is to be controlled, and 4 designates the controlling or operating connection between the thermostat and the controlling valve for the heating medium.

In order to obtain accurate and close regulation of the temperature of the room or apartment to be heated, the valve which controls the supply of heating medium is of the balanced type and it is preferably of such construction that, under any ordinary pressure variation of the heating medium either at the inlet or the outlet side of the valve, or under any barometric changes in the atmosphere, the valve will operate positively and accurately under the control of the thermostat. As shown, the balanced valve 2 is connected in the heating medium supply pipe at a point between the radiator and the ordinary angle cock 5. The balanced valve comprises a casing 6 having an inlet 7 through which the heating medium enters the valve and an outlet 8 through which the heating medium passes from the valve to the radiator. The inlet and outlet of the valve are separated by the double partitions 9 which have alined valve seats 10 therein, and a pair of valve members 11 are arranged to coöperate with these seats, the valve members being connected to operate in unison by a stem 12 which is preferably of triangular cross-section, as will appear from Fig. 5, the stem operating to accurately center the valve members relatively to their seats. The valve has a transverse chamber 13 therein which is in communication with the outlet 8 leading to the radiator, and the ends of this chamber are closed by flexible diaphragms 14 and 15 which are preferably of the round bellows type, as shown. The inner ends of these diaphragms are soldered or otherwise fitted to a pair of heads 16 and 17, these heads being fixed to the respective ends of the valve stem 12, and the outer ends of the diaphragms are soldered or otherwise tightly fitted to caps 18 and 19 respectively, the caps being secured to the respective ends of the chamber 13 of the valve casing by ring nuts 20 and 21. Preferably, and as shown, the valve stem has a threaded end 22 which engages in the head 17 to secure the latter to the valve, while the opposite end of the valve stem has a prong or extension 23 which has a threaded portion 24 over which the head 16 is passed, and a nut 25 threaded on the portion 24 of the prong serves to secure the head 16 to the valve. The cap 19 is fitted to receive the pipe or tube 26 which connects with the thermostat, and this cap is also preferably provided with a plug 27 in its upper portion to enable air to be vented from the chamber formed within the diaphragm 15 when the latter is being filled with oil or other liquid.

The cap 18 has an outwardly projecting neck 28 which is threaded internally to receive an adjusting screw 29 which screw abuts against a helical compression spring 30, the opposite end of this spring bearing against the head 16. The spring 30 acts in a direction to open the valve and the power of this spring may be adjusted from the exterior of the valve by rotation of the set-screw 29. The valve as described in conjunction with the thermostat to be hereinafter described will operate satisfactorily to maintain a substantially uniform temperature in the room or chamber to be heated. It is preferable, however, to close the chamber within the diaphragm 14 from communication with the atmosphere in order to protect the head 16 from the influences of variations in barometric pressure. As shown, a casing 31 in the form of a bulb is fitted tightly to the cap 18, this bulb-shaped casing providing an air chamber the temperature of which will be practically uniform, and the chamber within the diaphragm 14 is hermetically sealed from the atmosphere. Variations in barometric pressure, therefore, have no influence upon the head 16 and, moreover, the enlarged portion of the casing 31 compensates for expansion of the air within the diaphragm 14 when the temperature of such air is increased, thereby avoiding any disturbance in the balance of the valve.

The balanced valve for regulating the supply of heating medium is controlled by a thermostat 3 which is located in the room or space to be heated. Thermostats of different forms capable of producing the necessary power to operate the valve may be used. It is preferable, however, to employ a thermostat similar to that shown in Fig. 3. It comprises, in the present instance, a double wafer diaphragm 32 which contains a liquid which will volatilize and develop pressure at a comparatively low temperature, ethyl chlorid being suitable for the purpose. This diaphragm 32 has its outer wall attached to a head 33 provided with a stem 34, the stem passing through a rigid strap 35 the ends of which are secured to a stationary support 36, and the body portion of the head 33 abuts against the strap. A nut 37 is threaded on the stem 34 and abuts against the opposite side of the strap. The side of the diaphragm 32 opposite to the head 33 is provided with a head 38 which is threaded internally to receive the stem 39 of a head 40, the latter being attached to the adjacent wall of a second double wafer diaphragm 41. The opposite wall of this diaphragm 41 is secured to a head 42 which latter has a stem 43 which is fitted tightly into the support 36 and is provided with a bore or passage 44 which communicates with the interior of the diaphragm 41. The tube or pipe 26 which is connected to the balanced valve 2 has its opposite end fitted into the support 36 so as to communicate with the interior of the diaphragm 41. The latter may be provided with a filling hole 45 and a screw or plug 46 may be provided for normally closing this hole. A perforated shell 47 is preferably fitted over the operative parts of the thermostat in order to protect the diaphragm from injury, this shell being held in place by a screw 48 which engages in the strap 35. In using a thermostat of this type to control the valve 2, the diaphragm 41, the tube 26, and the chamber within the diaphragm 15 are filled with oil or other liquid which will serve as an operating connection between the thermostat and the valve 2. During filling of the parts named, the screw or plug 46 is removed so that the oil may be introduced at such point and the plug 27 is removed until all air has been vented, whereupon the plug 27 is replaced and the diaphragm 41, the tube 26, and the space within the diaphragm 15 are completely filled with the oil, whereupon the screw or plug 46 is inserted to tightly close the filling hole 45. If desired, a thermometer 49 may be set in a recess 50 in the front face of the shell or shield 47.

In the arrangement shown in the present instance, the invention is applied to a steam radiator, the steam flowing thereto from the hand valve 5 through the balanced valve 2, and condensation leaves the radiator through an ordinary radiator trap located at the opposite end thereof. Throttling of the steam by the valve 2 controls the amount of steam entering the radiator, and the temperature of the room is maintained uniform by the automatic operation of the valve 2 due to changes in the pressure of the vapor contained in the diaphragm 32 of the thermostat.

The operation may be described, briefly, as follows:—In adjusting the apparatus after its installation, the room is first heated to a temperature which is one degree lower than the temperature at which it is desired to maintain the room, and the set-screw 29 controlling the spring 30 is screwed or unscrewed until the valve members 11 are one-sixteenth of an inch off their seats (which can be detected by moving the prong 23), the adjustment of the set-screw 29 being effected while the casing 31 is detached from the cap 18. After the set-screw 29 has been thus adjusted, the casing 31 is applied with an air-tight fit to the cap 18. When the temperature in the room increases one or two degrees, increased pressure is developed in the diaphragm 32 of the thermostat, in consequence of which the diaphragm 41 of the thermostat is compressed sufficiently to cause a flow of the liquid in the tube 26 and the chamber within the diaphragm 15, this liquid acting on the head 17 to completely seat the valve members 11 and thereby cut off all flow of steam to the radiator, or the valve members 11 may be brought close to their seats, thus throttling the flow of steam to the radiator to the exact quantity required to maintain the desired room temperature. Should the temperature of the room drop one or two degrees, the pressure of the vapor in the diaphragm 32 becomes reduced, the pressure of the liquid in the diaphragm 41, the tube 26, and the chamber within the diaphragm 15 also becomes reduced, and the spring 30 is then able to move the valve members 11 toward open position. An increase in the temperature of the room causes the pressure in the diaphragms 32 and 41 to again increase, and the liquid within the diaphragm 15 is at a pressure sufficiently high to overbalance the spring 30 and to again move the valve members 11 toward closed position. By these repeated actions, the room temperature can be maintained automatically within reasonable limits, particularly when the chamber 31 is used to preserve a constant pressure at the outer side of the head 16 to avoid the effects of barometric variations and to receive the air expanded by heat within the diaphragm 14.

Preferably, and as shown, the valve members 11 have the same area exposed to the pressure of steam at the inlet 7 of the valve and are always balanced irrespective of the pressure in the inlet 7, and the diaphragm heads 16 and 17 are also of equal area and hence are always balanced irrespective of the pressure of steam in the outlet 8 of the valve. The diaphragms 32 and 41 of the thermostat are preferably of the same diameter so that all changes in atmospheric pressure will operate equally on both diaphragms without affecting the internal fluid pressure in either diaphragm. With a given temperature in the room, the vapor in the diaphragm 32 of the thermostat has a certain pressure which pressure is transmitted to the liquid in the diaphragm 41, and as this latter diaphragm is in communication with the chamber within the diaphragm 15, the pressure within this latter diaphragm always corresponds to the temperature in the room. The pressure of the liquid within the diaphragm 15 acts on the head 17 to close the valve 2, but the spring 30 in this valve is adjusted so that it exactly balances the force of the pressure of the liquid in the diaphragm 15 at the desired or predetermined room temperature. Therefore, a slight increase in the pressure of the liquid in the diaphragm 15, due to a rise in the temperature of the room, will close the valve 2, and a reduction in the pressure of the liquid in the diaphragm 15, due to a slight drop in the temperature of the room, will cause opening of the valve 2. The pressure of the spring 30 against the head 16 is always the same when once set, but the pressure of the liquid against the head 17 changes with changes in the temperature in the room.

It will be understood that means of different kinds may be provided for transmitting motion from the thermostat to the controlling valve for the heating medium whereby said valve will respond automatically to the thermostat upon the occurrence of temperature changes in the room being heated. Preferably, and as shown, however, a body of liquid serves as such means.

A thermostatically-controlled valve embodying the present invention is positive in action, it is sensitive in operation, and it will automatically regulate, within close limits, the temperature of an artificially heated room or other space. Moreover, it is practical in construction and can be made at reasonable cost.

I claim as my invention:—

1. The combination of a balanced valve having its valve members connected to a pair of opposed cylindrical corrugated flexible diaphragms both subject to the same internal valve pressure on their inner faces, a thermostat exterior to the valve and containing a fluid of low volatility, and means for transmitting the force produced by the vapor pressure of said fluid to one of said diaphragms to move the same and thereby operate the valve.

2. A regulating valve comprising a casing having inlet and outlet passages and openings connecting them, valve members controlling said openings, a pair of flexible diaphragms having their inner faces of equal area and subject to the pressure at the outlet side of said openings, means for applying an actuating force to the outer face of one of said diaphragms, a spring acting in opposition to said force, and a casing closing the other diaphragm to the atmosphere and providing an expansion chamber for air at the outer side of the latter diaphragm.

3. A regulating valve comprising a casing having inlet and outlet passages and openings connecting them, valve members controlling said openings, a pair of flexible diaphragms having their inner faces of equal area and subject to the pressure at the outlet side of said openings, means for admitting an actuating fluid to the outer face of one of said diaphragms, a spring acting in opposition to said fluid, and a casing closing the outer face of the other diaphragm to the atmosphere and providing an expansion chamber for air at the outer side of the latter diaphragm.

4. The combination of a balanced valve, opposed flexible diaphragms in operative engagement with the members of said valve and both subject to the same valve pressure on their inner faces, a hermetically sealed thermostat having a flexible body capable of expanding and contracting by pressure variations within it, said body containing a liquid having low volatility, and means for transmitting motion from the thermostat to one of said diaphragms of the balanced valve to operate it.

5. The combination of a balanced valve, opposed flexible diaphragms in operative contact with the members of said valve and both subject to the same internal valve pressure, a thermostat composed of a hermetically sealed flexible chamber containing a liquid of low volatility, a flexible diaphragm chamber engaging said thermostat, and a tube connecting said flexible chamber with one of the opposed diaphragms of the balanced valve whereby vapor pressure variations within the thermostat chamber are transmitted by fluid in said tube to the valve to operate the latter.

6. An automatic temperature regulator comprising a balanced heat controlling valve, a pair of opposed flexible diaphragms both subject to the same valve pressure and to which diaphragms the members of said valve are connected, one of said flexible diaphragms forming a fluid-tight flexible chamber, a thermostat embodying a hermetically sealed flexible chamber located at a distant point relatively to the valve and containing a liquid of low volatility, a fluid-tight flexible chamber in contact with said thermostat whereby expansion of the thermostat will compress said fluid-tight chamber, a tube connecting the latter flexible chamber to the flexible chamber associated with the valve, said flexible chambers and said tube being hermetically sealed and containing a fluid through the medium of which force is transmitted from the thermostat to the heat controlling valve to operate the latter.

7. The combination of a balanced heat-controlling valve comprising a casing and connected valve members operative therein, opposed flexible diaphragms contained within said chamber and subject to the same valve pressure therein, said diaphragms being connected to the members of said valve, ring nuts for securing said flexible diaphragms to the valve casing, a thermostat free from the influence of temperature and pressure of the heating medium which flows through the valve, and means for transmitting force from the thermostat to the valve to operate the latter.

8. The combination of a balanced valve having its controlling element in operative connection with a pair of opposed flexible diaphragms both subject to the same internal valve pressure on their inner faces, a thermostat exterior to the valve and containing a fluid of low volatility, and means for transmitting the force produced by the vapor pressure of said fluid to one of said diaphragms to move the same and thereby operate the valve.

9. The combination of a balanced valve having its valve members in operative contact with a pair of opposed flexible diaphragms both subject to the same internal valve pressure on their inner faces, a thermostat exterior to the valve and containing a fluid of low volatility, means for transmitting the force produced by the vapor pressure of said fluid to one of said diaphragms to move the same and thereby press the valve members to their seats, and a spring bearing against the other diaphragm in opposition to the force from said thermostat.

In testimony whereof I have hereunto set my hand in presence of two subscribing witnesses.

THOMAS N. THOMSON.

Witnesses:
C. N. THOMSON,
E. R. THOMSON.